United States Patent Office 3,255,152  
Patented June 7, 1966

3,255,152  
PROCESS FOR THE PRODUCTION OF ORGANOPOLYSILOXANE ELASTOMERS WITH IMPROVED HEAT RESISTANCE  
Wilfried Kniege, Cologne-Mulheim, Germany, assignor to Farbenfabriken Bayer Aktiengesellschaft, Leverkusen, Germany, a German corporation  
No Drawing. Filed May 6, 1963, Ser. No. 278,405  
Claims priority, application Germany, May 10, 1962, F 36,763  
2 Claims. (Cl. 260—46.5)

The invention relates to an improvement of the known elastic cross-linking products based on diorganosiloxane polymers to which fillers and, for cross-linking at elevated temperature, organic peroxides are customarily added.

A valuable property of elastomers of this type is their stability in dry heat, but this stability is lacking in so-called closed systems (cf., for example, Bobear in "Rubber Age," N.Y., 84, December 1958, pages 448–450). Systems of this type are always present when the elastomers are encapsuled to such an extent that the cleavage products formed by the action of heat have no sufficient possibility of escaping, and also when, at elevated temperature, oxygen cannot act on the elastomers at the same time. These conditions arise, for example, in electric cables with an insulation of organopolysiloxane and with a casing of metal or a close-textured glass fibre fabric. Similar conditions frequently prevail in sealing devices, for example when the material has to be kept under oil and is thus largely cut off from the access of atmospheric oxygen.

It has now been found that the disadvantages described above can be obviated to a large extent by the addition of low-melting metal to the cross-linking mixture. The invention provides a process for the production of organopolysiloxane elastomers with improved heat resistance from mixtures containing long-chain diorganosiloxane polymers, usual fillers and organic peroxides, with heat treatment, by adding to the mixture, per 100 g. of diorganosiloxane polymer, an amount of between 0.5 and 50 g., preferably between 5 and 25 g., of heavy metal melting below the temperature applied for cross-linking.

The cross-linking diorganosiloxane polymers and their production are known. They consist mostly of dimethylsiloxane units, but some of their methyl radicals can also be replaced by vinyl or phenyl radicals.

Among the peroxides bringing about the cross-linking, preference is generally given to dialkyl-, di-(arylalkyl)-, alkyl-(arylalkyl)-peroxides and peroxyalkanes, since they result in a higher stability of the cross-linking products than the peroxides derived from acids. However, small portions of aroyl peroxides are additionally used in some cases besides the first-mentioned peroxides for reasons of processing technique.

As filler, finely dispersed silicic acid is primarily to be mentioned which advantageously should be largely anhydrous and can moreover be hydrophobed by treatment with alkyl chlorosilanes. Usual pigments may also be added. It is also possible to use other known additives, such as diphenyl silane-diol for controlling the structure of the stock mixture, and compounds containing Si—O—C groups which are known to increase the stability of siloxane elastomers.

The metal additive according to the invention may consist of one element, for example tin, or of an alloy of several elements, preferably eutectic mixtures of elements of the tin, lead, bismuth, cadmium, zinc, antimony or copper series.

The following examples are given for the purpose of illustrating the invention.

*Examples 1–9*

A number of mixtures are prepared in the manner described below with the use of a polydiorganosiloxane of a viscosity between $10^6$ and $10^7$ cst. obtained in known manner by alkaline polymerisation from a mixture of 99.75 percent by weight of octamethyl cyclotetrasiloxane and 0.25 percent by weight of tetramethyl tetravinyl cyclotetrasiloxane (the parts are parts by weight):

100 parts of the polysiloxane are mixed in each case with 30 parts of commercial finely dispersed silicic acid (Aerosil), 0.4 part of dicumyl peroxide and 10 parts of ground metal of the composition listed in the following table. These mixtures are previously cross-linked in conventional manner in a vulcanizer at 170° C. for 6 minutes and subsequently worked up by allowing them to stand in hot air at 250° C. for 6 hours.

From each of the elastomers thus obtained and one control elastomer without metal additive, but otherwise prepared in analogous manner, 10 test pieces (standard rods St I according to DIN 53,504) were punched, half of which were retained for comparison. Of the remaining test pieces, every five identical ones were fused together into a test tube and stored for heat aging at 200° C. for 8 days. By this storage the heat action in a closed system was reproduced in an extreme form. The following table shows the mean values, measured in conventional manner, of the tensile strength retained in the test pieces thus aged in comparison with the non-aged pieces, giving the metal additive for each case (percent denotes percent by weight of alloy component).

| Metal | Melting temperature, °C. | Tensile strength (kp./cm.²) | |
|---|---|---|---|
| | | Not aged | Aged |
| Control without metal | | 75 | (¹) |
| (1) 56% Bi+44% Pb | 125 | 65 | 60 |
| (2) 58% Bi+42% Sn | 136 | 70 | 65 |
| (3) 62% Bi+38% Cd | 144 | 72 | 70 |
| (4) 50% Sn+32% Pb+18% Cd | 145 | 70 | 65 |
| (5) 68% Sn+32% Cd | 180 | 73 | 67 |
| (6) 91% Sn+9% Zn | 199 | 75 | 70 |
| (7) 100% Sn | 232 | 70 | 68 |
| (8) 75% Sn+12.5% Cu+12.5% Sb | 233 | 70 | 69 |
| (9) 82.5% Pb+17.5% Cd | 248 | 72 | 68 |

¹ Test piece destroyed.

*Example 10*

A number of mixtures are prepared in the manner described below with the use of a polydiorganosiloxane of viscosity between $10^6$ and $10^7$ cst. obtained in known manner by alkaline polymerisation from a mixture of 92 percent by weight of octamethyl cyclotetrasiloxane, 7.5 percent by weight of tetramethyl tetraphenyl cyclotetrasiloxane, and 0.5 part by weight of tetramethyl tetravinyl cyclotetrasiloxane (the parts are parts by weight):

100 parts of the polysiloxane are mixed in each case with 40 parts of a silicic acid prepared according to U.S. patent specification No. 2,993,809 and hydrophobed with dimethyl dichlorosilane, 0.5 part of tetraethoxysilane, 4 parts of diphenyl silande-diol, 8 parts of iron oxide, and the amount specified in the following table of the metal alloy consisting of 38 percent by weight of cadmium and 62 percent by weight of bismuth. Mixing is carried out in known manner in a roller mill at 160° C. When the mixture has cooled down 0.35 part of cumyl-(tert.-butyl) peroxide and 0.1 part of bis-(2,4-dichlorobenzoyl) peroxide are further added to each mixture at a mixing temperature of 25° C. The mixtures thus obtained are preliminarily cross-linked in conventional manner in a vulcanizer at 150° C. for 10 minutes and subsequently worked up by allowing them to stand in hot air at 200° C. for 2 hours.

These elastomers and a control elastomer without metal additive, but otherwise prepared in an analogous manner were tested according to the method described in Example 1 and gave the tensile strength values listed in the following table, dependent on the amount of metal alloy of bismuth and cadmium employed per every 100 parts of polysiloxane.

| Metal additive | Tensile strength (kp./cm.$^2$) | |
|---|---|---|
| | Not aged | Aged |
| 0.0 | 83 | 8 |
| 0.5 parts | 82 | 22 |
| 1 part | 82 | 38 |
| 5 parts | 80 | 70 |
| 10 parts | 78 | 75 |
| 25 parts | 72 | 70 |
| 50 parts | 65 | 65 |

The electric properties of the elastomers were not significantly influenced by additions of up to 25 percent by weight of metal.

I claim:

1. In a process for the production of organopolysiloxane elastomers by heating to a temperature in the range of 250° C. and more, a mixture containing heat curable long-chain dihydrocarbosiloxane polymers, fillers and alkyl or arylalkyl peroxides, the hydrocarbon radicals of said dihydrocarbosiloxane polymers being selected from the group consisting of methyl, vinyl and phenyl, the improvement which comprises adding to said mixture a metallic additive having a melting point of from 125 to 248° C., selected from the group consisting of tin and alloys of bismuth and cadmium, bismuth and lead, bismuth and tin, cadmium and lead, cadmium and tin, tin, copper and antimony, tin and zinc, and cadmium, lead and tin, in an amount from 0.5 to 50 g. per 100 g. of said dihydrocarbosiloxane polymers.

2. A composition of matter comprising heat curable long-chain dihydrocarbosiloxane polymers, fillers, alkyl or arylalkyl peroxides and a metallic additive having a melting point of from 125 to 248° C. in an amount from 0.5 to 50 g. per 100 g. of said dihydrocarbosiloxane polymers, the hydrocarbon radicals of said dihydrocarbosiloxane polymers being selected from the group consisting of methyl, vinyl and phenyl, the said metallic additive being selected from the group consisting of tin and alloys of bismuth and cadmium, bismuth and lead, bismuth and tin, cadmium and lead, tin, copper and antimony, cadmium and tin, tin and zinc, and cadmium, lead and tin.

References Cited by the Examiner
UNITED STATES PATENTS

| | | | |
|---|---|---|---|
| 2,448,530 | 9/1948 | Jones | 260—37 |
| 2,683,673 | 7/1954 | Silversher | 260—37 |
| 2,891,033 | 6/1959 | Savage | 260—46.5 |
| 3,114,721 | 12/1963 | Bobear | 260—46.5 |
| 3,137,665 | 6/1964 | Retford | 260—37 |

LEON J. BERCOVITZ, *Primary Examiner.*

MURRAY TILLMAN, *Examiner.*

M. I. MARQUIS, *Assistant Examiner.*